United States Patent [19]

Rueff et al.

[11] Patent Number: 4,558,555
[45] Date of Patent: Dec. 17, 1985

[54] FEEDER E.G. FOR SOAP TABLETS TO WRAPPING MACHINE

[75] Inventors: Herbert Rueff, Casalecchio di Reno; Oscar Manfredi, Bologna, both of Italy

[73] Assignee: Azionaria Costruzioni Macchine Automatiche - A.C.M.A. - S.p.A., Bologna, Italy

[21] Appl. No.: 574,325

[22] Filed: Jan. 27, 1984

[30] Foreign Application Priority Data

Feb. 7, 1983 [IT] Italy .................................. 3330 A/83

[51] Int. Cl.⁴ .............................................. B65B 63/00
[52] U.S. Cl. ........................................ 53/493; 53/244; 53/251
[58] Field of Search ............... 53/493, 494, 495, 244, 53/251, 250, 249

[56] References Cited

U.S. PATENT DOCUMENTS

| | | | |
|---|---|---|---|
| 2,393,389 | 1/1946 | Lippold | 53/279 |
| 2,621,841 | 12/1952 | Simpson | 53/279 |
| 3,225,891 | 12/1965 | Hickin et al. | 53/251 X |
| 3,374,600 | 3/1968 | Rademacher et al. | 53/251 X |
| 3,592,003 | 7/1971 | Stichhan | 53/251 |
| 3,777,453 | 12/1973 | Zimmermann et al. | 53/251 |

Primary Examiner—James F. Coan
Attorney, Agent, or Firm—Alan N. McCartney

[57] ABSTRACT

A feeder for feeding products, for example soap tablets, to a continuously moving receiving conveyor having a succession of containers includes at least one product pick-up station adjacent the start of the receiving conveyor, a carousel placed between said station and said start, sucker assemblies mounted on the carousel for movement along and rotation around their own vertical axis. The feeder further includes means driving said carousel in an intermittent rotary movement to halt the feeding sucker assemblies above said station and then to move in synchronism with the receiving conveyor, first control means for controlling sliding movements of the assemblies along their axes, means controlling intermittent application of vacuum to the assemblies for picking up products from said station and then releasing them onto containers of the receiving conveyor, second control means for effecting angular movements of the assemblies around their axes to orient the products with the containers.

6 Claims, 5 Drawing Figures

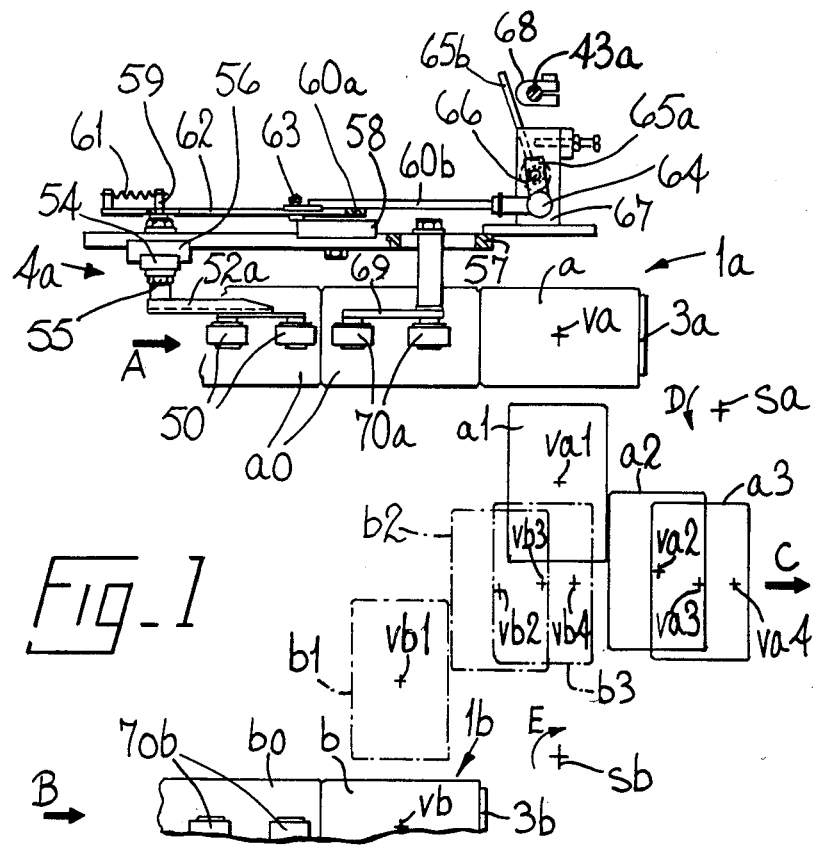
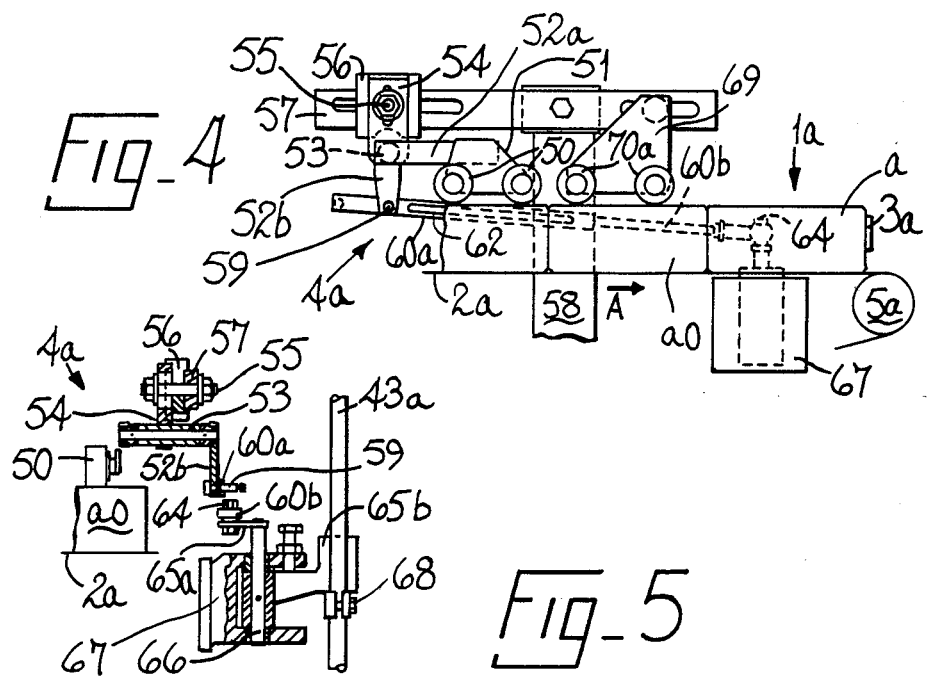
Fig. 1
Fig. 4
Fig. 5

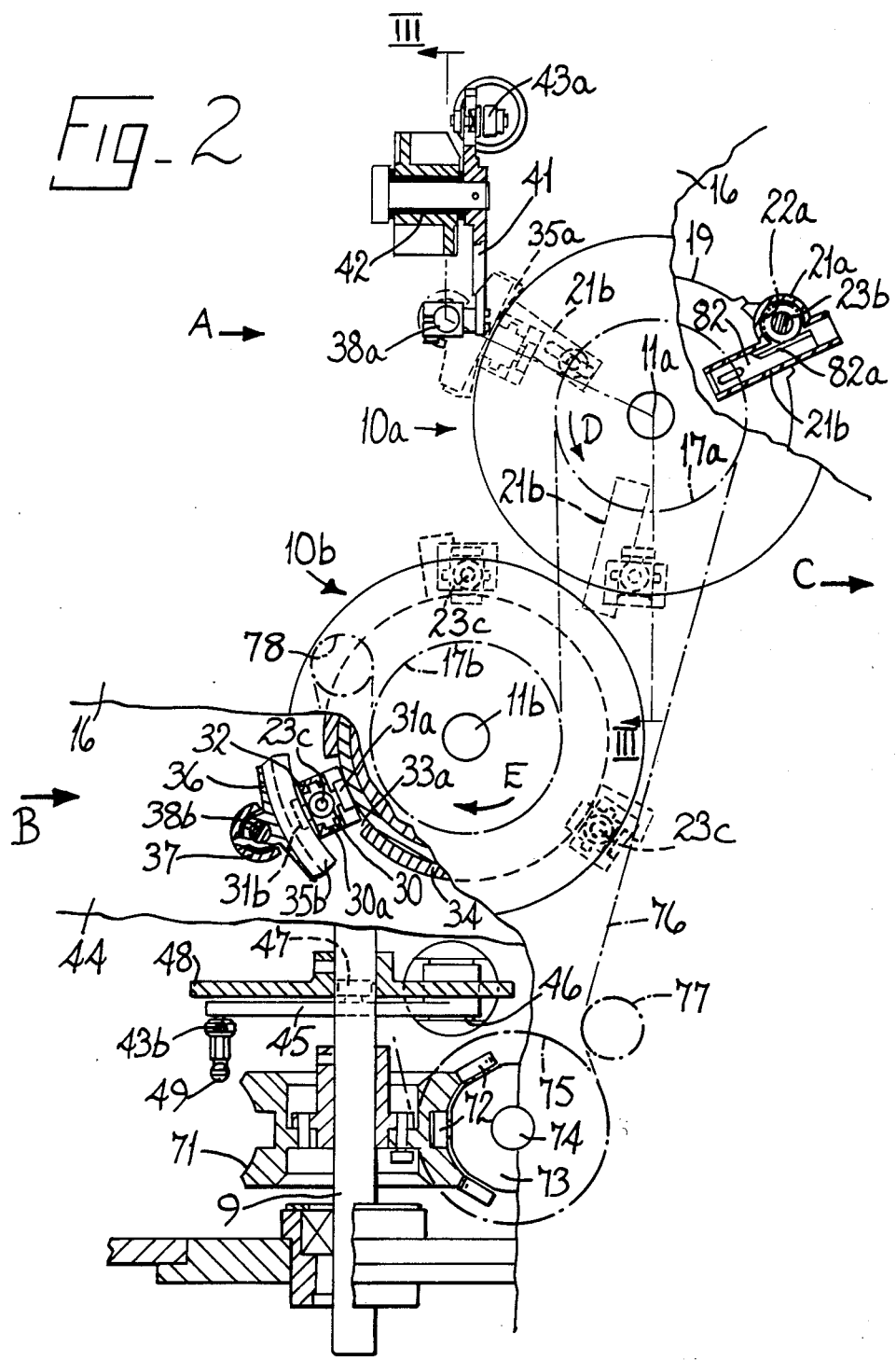

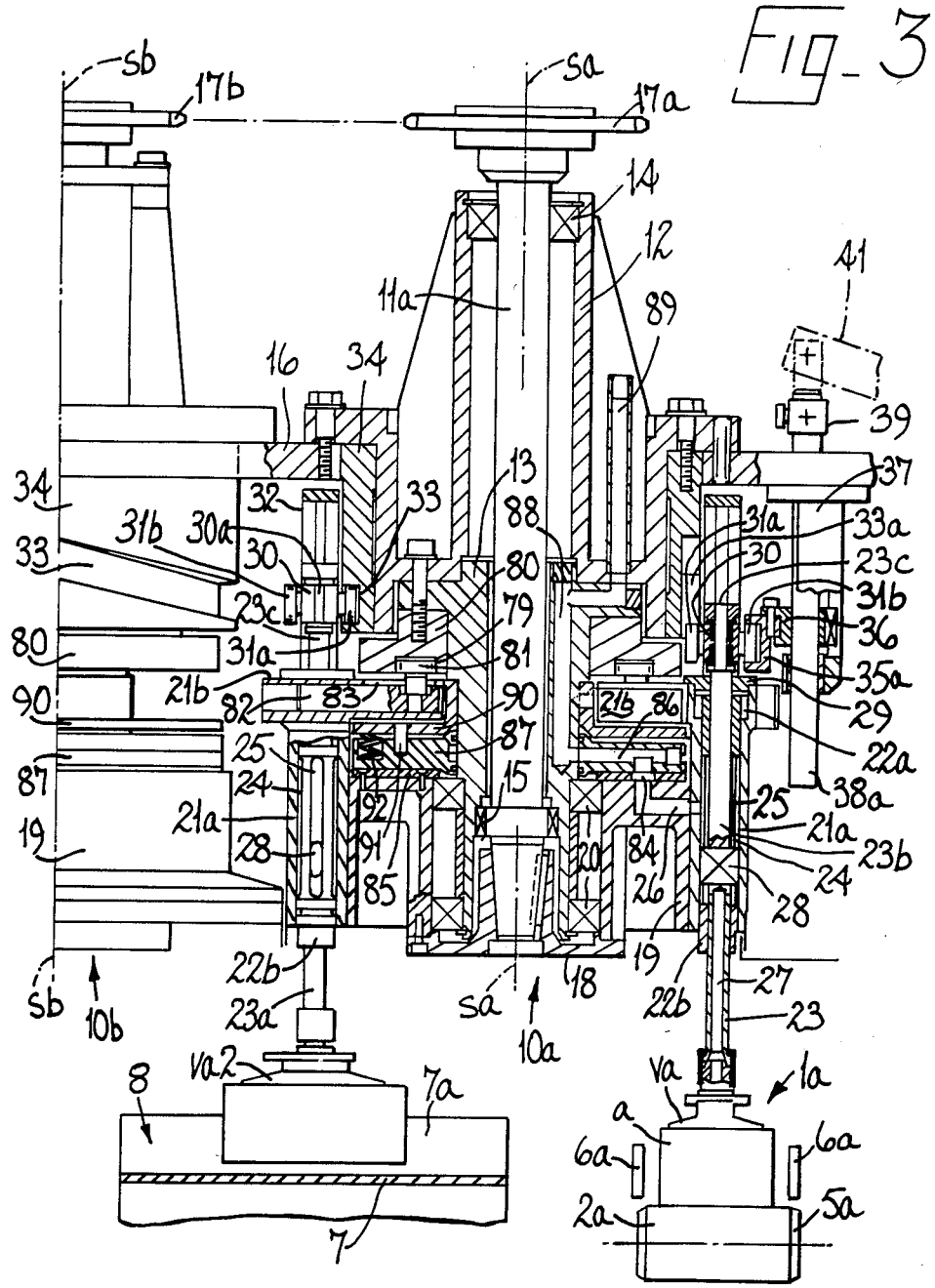
Fig_3

FEEDER E.G. FOR SOAP TABLETS TO WRAPPING MACHINE

FIELD OF THE INVENTION

The present invention is concerned with a feeder for transferring products of generally parallelepiped or oval shape to a continuously moving receiving conveyor having a series of successive containers.

BACKGROUND OF THE INVENTION

Delivery machines exist, e.g. presses for shaping soap tablets, which are able to supply said products to one or two delivery conveyors which deliver them to a related pick-up station. Each delivery conveyor commonly consists of a smooth, continuously moving conveyor belt, on which the products are transferred, one after another, to form a stack accumulated against a barrier at the end of the conveyor. From this station the products are then sent to a receiving machine which puts them through further processing or making up phases; the receiving machine which in the specific case of soap tablets is intended to insert them into corresponding packets, has a receiving conveyor or transport belt, which is generally continuously moving and presents, one after the other, containers for the respective products. Feeders already exist which, under various conditions, provide for the transfer of products from delivery conveyors to receiving conveyors.

In the circumstances outline above the problem exists of operating such a transfer under the particular conditions where the continuously moving receiving conveyor carrying a series of successive containers, is actually disposed to receive tablets with a different orientation from that in which they are delivered to the pick-up station by the delivery conveyors.

OBJECTS OF THE INVENTION

An object of the present invention is to provide a feeder which solves such a problem and which is contrived to be of simple structure, compact, easily adaptable to the dimensions of the products and of reliable operation, bearing in mind the delicacy of products such as soap tablets.

SUMMARY OF THE INVENTION

The above and other objects are achieved by providing a feeder for feeding products of generally parallelepiped or oval shape to a continuously moving receiving conveyor having a series of successive containers comprising at least one product pick-up station at the end of an associated delivery conveyor and adjacent the start of the receiving conveyor, an associated carousel placed between such a pick-up station and said start of the receiving conveyor, a series of feeding sucker assemblies arranged regularly around the carousel at a higher level than the delivery and receiving conveyors and mounted on the carousel for movement along and rotation around their vertical axes, means for driving the carousel in predetermined intermittent rotary motion so arranged that the carousel halts with the feeding sucker assemblies above said pick-up station and then move in synchronism with the receiving conveyor and with the feeding sucker assemblies above and in register with containers thereof, first control means for controlling sliding movement of the feeding sucker assemblies along their axes arranged so that the assemblies descend and then ascend both when the assemblies are stationary at the pick-up station and when the assemblies are moving in synchronism with the receiving conveyor in register with the pockets, means controlling the intermittent application of vacuum to the feeding sucker assemblies so that vacuum is applied to effect the lifting of the products from the pick-up station and then their release into containers with which they are in register, second control means for effecting alternate angular movements of the feeding sucker assemblies around their axes so that both these and the products lifted by them at the pick-up station are subjected, after being lifted, to a rotation so that the products are oriented in accordance with the containers of the receiving conveyor and then, while accompanying the conveyor, to a counter-rotation to maintain the same orientation.

BRIEF DESCRIPTION OF THE DRAWINGS

There now follows a detailed description, to be read with reference to the accompanying drawings of a feeder embodying the invention. It will be realized that this feeder has been selected for description to illustrate the invention by way of example.

In the accompanying drawings:

FIG. 1 is a partial plan view and working diagram of a feeder embodying the invention;

FIG. 2 is another plan view of the feeder, with parts in section at various levels;

FIG. 3 is a view of the feeder in vertical section generally on the line III—III of FIG. 2;

FIG. 4 is a front view of a pick-up station; and

FIG. 5 is a side view, partly in section of part of the pick-up station.

DESCRIPTION OF THE PREFERRED EMBODIMENT

The feeder shown in the drawings comprises stations 1[a] and 1[b] for the placing and pick-up of products [a] and [b] of approximately parallelepiped shape, for example soap tablets. A product is delivered, little by little, to stations 1[a] by a delivery conveyor comprising a smooth continuously moving conveyor belt 2[a] (FIGS. 3, 4 and 5): an upper branch of the belt 2[a] in fact carries the products one after another and advances in direction A. At the station 1[a] the product [a] abuts and stops at a stationary barrier 3[a] (FIGS. 1 and 4); products [a]0, immediately upstream of products [a], are accumulated against it. In normal working conditions of the feeder a minimum number of products thus accumulated abutting each other are required; this minimum number is detected by a sensor device 4[a] (FIGS. 1, 4 and 5) which will be described later. The barrier 3[a] is disposed adjacent a transmission roller 5[a] of the belt 2[a] and transverse to the belt 2[a] and is adjustable length-wise of the belt 2[a] depending on the shape of the product. Side panels 6[a] (FIG. 3) which guide the products carried by the belt 2[a] are also adjustable, depending on the shape.

The station 1[b] is similarly arranged and comprises a barrier 3[b] and conveyor belt 2[b] advanced in a direction B parallel to A.

It is envisaged that the products have one of their dimensions greater than the others and that their longest dimension lies length-wise of the conveyor belt. When the products are soap tablets, the conveyor belts 2[a] and 2[b] constitute the outlet of a press which shapes the soap tablets. It is further envisaged that the ends of the conveyor belts are staggered and thus that the stations 1[a] and 1[b] and barriers 3[a] and 3[b] are not transversely aligned. The conveyor belts 2[a] and 2[b] terminate adjacent and one at either side of the start of a receiving conveyor which comprises a conveyor belt 7 (FIG. 3) presenting a series of successive containers 8. The belt 7 comprises a series of projections 7[a] transverse to the belt and distributed regularly along it, between which the containers 8 are defined. An upper branch of the belt 7, which is approximately at the level of the upper branches of the belts 2[a] and 2[b], advances in continuous motion in a direction C and thus is parallel to and intermediate the belts 2[a] and 2[b] and can be regarded as providing a continuation of these. The products, transferred from the belts 2[a] and 2[b], are intended to be placed in their corresponding containers with their longer dimension oriented transversely of the belt 7, that is after being rotated by 90° in relation to their original orientation. Especially in the case of soap tablets, it is envisaged that the receiving conveyor belt 7 forms part of a well known packaging machine which introduces and encloses the tablets in respective boxes.

The motion of the feeder embodying the invention is derived from the timing shaft of such a packaging machine, or more usually, a receiving machine; the continuous rotary motion of a main shaft 9 (FIG. 2) of the feeder is in fact derived from this timing shaft and as will be shown later, two carousels 10[a], 10[b] (FIGS. 2 and 3) of the feeder are driven by the main shaft. The carousels 10[a], 10[b] are located between the beginning of the belt 7 and respective stations 1[a] and 1[b], and are mounted for rotation about axes s[a] and s[b] of respective vertical shafts 11[a] and 11[b] (it should be noted that in FIG. 3, for clarity, the axis s[b] has been shown slightly displaced from its actual position relative to the axis S[a] which is shown in its correct position relative to the rest of the feeder). The shaft 11[a] (and likewise the shaft 11[b]) extends through an upper support 12 and a lower body 13 in the form of tubular elements which support the shaft 11[a] for rotation in bearings 14, 15; the support 12 and body 13 are fixed to each other and to a plate 16 of the frame of the feeder, in a hole in the plate 16.

At the upper end of the shaft 11[a] a gear wheel 17[a] (gear wheel (17[b] for the shaft 11[b]) is keyed, and at the lower end an element 18, forming a sleeve and a washer; above the washer is fixed a kind of annular drum 19 which is mounted for rotation outside a lower part of the body 13 on bearings 20. A number of sets of feeding sucker assemblies are regularly arranged around the drum 19, there being three sets each set being mounted on the drum 19 for sliding movement along and rotation around a vertical axis. Every 120° a vertical tubular member 21[a] is externally fixed to the drum 19, tangentially intersected at the top by a horizontal tubular member 21[b] which together with the member 21[a] provides a single part, the member 21[b] extending radially towards the central part of the body 13 (FIGS. 2 and 3). Coaxially within each member 21[a] an associated tubular element 22 is supported by rotation, and receives a rod axially 23 which terminates at its lower end in a feeding sucker [va].

The tubular element 22 comprises an external pinion 22[a] at an upper end, a lower end portion 22[b] and a long central section of reduced external diameter to define with the internal surface of the member 21[a], an elongated chamber 24. The central section further has an elongated slot 25 passing diametrically there through. It can be seen that the chamber 24 communicates, through a hole radial to the member 21[a], with a lower end of a related conduit 26 machined in the drum 19. The chamber 24 communicates, through a hole diametrical to the rod 23 and corresponding with the slot 25, with the top of a conduit 27, which is axial to a lower section 23[a] of the rod 23 and which, below the drum 19 and member 21[a] terminates in the related feeding sucker [v]. Apart from this the chamber 24 is sealed, suitable gaskets being interposed between the ends of the tubular element 22, member 21[a] and rod 23. Furthermore the rod 23, approximately in the centre and a little above the conduit 27, is diametrically crossed by a type of key 28 which engages in the slot 25. The rod 23 is therefore fixed for rotation with the tubular element 22 but is able to slide axially relative to the element 22 as permitted by engagement of the key 28 in the slot 25. The rod 23 comprises, in addition to the lower section 23[a], a central section 23[b] and an upper section 23[c] which projects above a closure cover 29 of the member 21[a]. The upper section 23[c] is mounted for rotation in a block 30 which, by means of shoulders, is fixed for vertical movement with section 23[c]. The block 30 constitutes part of an activating head and carries diametrically opposed rollers 31[a], 31[b] mounted for rotation around a common horizontal axis; the rollers 31[a] project inwardly towards the body 13 and the rollers 31[b] outwardly of the carousel 10[a], 10[b]. In a plane perpendicular to the axis of the rollers 31[a], 31[b] the block has two external prismatic projections 30[a], diametrically opposite each other; these projections 30[a] are guided for sliding movement along vertical grooves of two uprights of a bridge 32, projecting upwardly from the members 21[a], 21[b]; the block 30 is thus restrained from rotation, but not from vertical movement.

The rod 23 of each feeding sucker assembly has however, in the rollers 31[a], 31[b], two operating means for effective vertical sliding movements of the associated feeding sucker [v], while remaining at a greater height than that of the respective stations 1[a], 1[b] and of the receiving belt 7. Each of the rollers 31[a] of the various feeding sucker assemblies of the carousels 10[a], 10[b] is normally engaged in a groove 33 formed on the exterior of a large sleeve 34, which is fixed around a bottom part of the support 12, the groove 33 providing a cam. Furthermore, this stationary groove 33 is inoperative in one sector which is disposed above the related one of the stations 1[a], 1[b]. In this sector the cam groove 33 has a break 33[a] provided by a milling in the relative part of the sleeve 34 so that the cam groove 33 is open at its lower side.

When the rod 23 reaches the break 33[a] the feeding sucker assembly passes to the control of a control part, viz. channel shaped sector 35[a], 35[b] which is facing the associated one of the carousels 10[a], 10[b]. The roller 31[b] of each of the rod 23 is intended to engage with the associated one of these channel sectors 35[a], 35[b]. The sectors 35[a], 35[b] are fixed in an adjustable manner to a correspondingly shaped slide 36 which is fixed, under the plate 16, to a vertical rod 38[a], 38[b] which is slidable vertically in a support 37; such a rod 38[a], 38[b] projects through the plate 16.

At the top of each of the rods 38[a], 38[b] is a clamp 39, to which an end portion of a rocker arm 41 is articulated. The rocker arm 41 is mounted on fulcrum 42 carried by a support, fixed on the plate 16; the other end of each rocker arm 41 is pivotally connected to an upper end of an associated one of two rods 43[a], 43[b] (FIGS. 1, 2 and 5). The two rods 43[a], 43[b] are of adjustable length, and project through the plate 16 and the upper member 44 of a box structure which forms part of the frame of the feeder and is located beneath the belts 2[a], 2[b] and 7. Each of the rods 43[a], 43[b] is mounted for vertical sliding movement and its lower end is articulated to one end of an associated rocker arm 45 (FIG. 2), the articulation being achieved in a similar manner to that of the rocker arm 41.

The other end of the rocker arm 45, is mounted on a fulcrum 46 carried by a support fixed to the bottom of the above mentioned box structure in which the shaft 9 is mounted for rotation, this shaft 9 being horizontal and positioned transversely to the belts 2[a], 2[b] and 7. Each rocker arm 45 has a roller 47 which is normally in contact, from below, with the periphery of an associated cam-shaped disc 48, keyed to the shaft 9; the roller 47 of the rocker arm 45 is urged into engagement with the disc 48 by a spring 49, which extends between the member 44 and the point of articulation between the relevant one of the rods 43[a], 43[b] and the rocker arm 45. In normal operation of the feeder, the disc 48 cyclically effects the ascent and descent of the associated one of the rods 43[a], 43[b] thus the descent and ascent of the rods 38[a], 38[b] and of the channel sectors 35[a], 35[b] respectively (in FIG. 3, the lowered position of the rod 38[a] is indicated by continuous lines and the raised position by dotted lines).

When a preselected minimum number of products is not accumulated against the barrier 3, the ascent of the associated rod 43[a], 43[b] is prevented, because the roller 47 will have momentarily lost contact with the associated disc 48, the rods 38[a], 38[b] and the channel sectors 35[a], 35[b] respectively thus remain in their raised position without being able to be lowered. This is achieved by the corresponding sensor device 4. Each sensor device (FIGS. 1, 4 and 5) comprises a pair of rollers 50, which have axes horizontal and transverse to the associated one of the belts 2[a], 2[b] and which are assembled, one in front of the other, on and projecting below a plate 51; the plate 51 projects from an arm 52[a] of a lever member also having an arm 52[b] at rightangles to the arm 52[a]: the arm 52[a] faces the associated one of the stations 1[a], 1[b] and is substantially horizontal, the arm 52[b] however, projecting downwardly and is substantially vertical. The lever member is mounted for pivotal movement about an axis parallel with that of the rollers 50 on a fulcrum 53 carried by a support 54. The support 54 is clamped, in a vertically adjustable manner, by clamp means 54 to a small cross-grooved block 56 which is also clamped by the clamp means 55, in an adjustable manner, in a slot of a horizontal beam 57 which is longitudinal to the associated one of the belts 2[a], 2[b]; the beam 57 is supported by an upright 58, vertically adjustable on the frame of the feeder. The arm 52[b] of the lever member is connected by a pivot pin 59, with slight play, to an upper part 60[a] of a connecting rod of adjustable length, this rod also comprising a lower-part 60[b]; the above mentioned play is controlled by a tension spring 61, which extends between the pivot pin 59 and the rear end of the part 60[a]; for the adjustment of the length of the connecting rod 60[a]/60[b], the part 60[a] is prismatic and equipped with a longitudinal slot 62, in which a bolt of clamping device 63 is engaged, which also passes through an adjacent end portion of the the part 60[b], which provides a prismatic coupling groove cooperating with the part 60[a]. The other end of the part 60[b] is articulated by a pin 64 to an arm 65[a] of a rocker arm, which is secured to a shaft 66 mounted for rotation about a vertical axis, in a support 67 fixed to the frame of the feeder. An arm 65[b] of the rocker arm is arranged so that it can obstruct a shoulder of the associated one of the rods 43[a], 43[b], the shoulder being constituted by a clamp 68 clamped on said one of the rods 43[a], 43[b]. Normally the rollers 50 of the sensor device 4 rest on upper surfaces of the products accumulated against the associated one of the barriers 3[a], 3[b] and the arm 65[a]/65[b] maintains the angular position indicated in FIG. 1 in which it does not obstruct the clamp 68. When, however, the rollers 50 descend because of the absence of a product beneath them, the rotation of the arms 52[a], 52[b] of the lever member and the consequent backward movement of the connecting rod 60[a]/60[b] causes the approach of the arm 65[b] to the associated one of the rods 43[a]/ 43[b] which is thus prevented from rising by engagement of its clamp 68 with the arm 65[b], the corresponding one of the channel sectors 35[a], 35[b] thus remaining in its raised position. On the arrival of further products, which restore the number of products accumulated against the barrier 3[a], 3[b], to the selected minimum, the rollers 50 are raised by said products and said one of the rods 43[a], 43[b] takes up its normal function again.

It should be noted that, in proximity to each of the stations 1[a], 1[b] a small plate 69 is mounted for adjustment along the beam 57; pairs of rollers 70[a], 70[b] are carried by the plates 69 disposed above the product which is immediately upstream of the product item abutting the one of the barriers 3[a], 3[b] at said station. All adjustments earlier indicated, permit the adaptation of each sensor device 4 to the shape of the products handled by the feeder.

On the shaft 9 of the feeder a wheel 71 is also keyed (FIG. 2) of the type which may be referred to as a "Z-wheel"; this type of wheel has shaped helical grooves which go from side to side of the wheel. Into the grooves of the wheel 71 successive rollers 72 of a wheel 73 are engaged; the wheel 73 is keyed to the lower end of a vertical shaft 74, to the top of which is keyed a gear wheel 75. A chain passes round the wheel 75 which also passes round the wheels 17[a], 17[b] of the carousels 10[a], 10[b], being suitably tensioned and returned by pinions 77, 78. This transmission unit, including the Z-wheels described above, provides means whereby the carousels 10[a], 10[b] are driven so as to rotate intermittently, in directions D and E respectively, through angles of 120° (in the case where the feeding sucker assemblies of each carousel are in threes) and with suitable characteristics and phases of motion. Thus the transmission unit is arranged so that the carousels 10[a], 10[b] are temporarily halted each time one of the feeding sucker assemblies arrives above the associated station 1[a], 1[b]; correspondingly at this time the rod 23 of such feeding sucker assembly passes into the control of the associated one of the channel sectors 35[a], 35[b], being withdrawn from the control of the associated stationary cam groove 33. It is also arranged that, in the time taken for the belt 7 to advance by two steps (or by two containers 8) each of the carousels 10[a], 10[b] pass from one stationary point to the next one, that is, they each advance by one feeding sucker assembly.

Each of the carousels 10[a], 10[b] has a second stationary cam groove 79 (FIG. 3) machined at its lower part in a disc 80, fixed to an upper part of tubular body 13. The disc 80, and likewise the sleeve 34 providing the cam groove 33, are fixed in such a manner as to be adjustable so that the appropriate phasing can be arranged and are composed of parts so as to facilitate assembly. Rollers 81, rotatable around vertical axes, are engaged in the cam groove 79; each roller 81 is carried by a slider 82, sliding longitudinally in an associated one of the tubular members 21[b] which has a longitudinal slot 83 in the top so that the roller 81 can be mounted on the slider. In each slider 82, at one of its edges, a rack 82[a] is provided (FIG. 2) which is geared with the pinion 22[a] of the associated tubular elements 22 of a feeding sucker assembly. During the rotation of a carousel 10[a], 10[b], the cam 79 therefore controls, as will be seen later, the alternate angular movements of the respective tubular elements 22 and thus through the engagement of the slot 25 and key 28, of the rods 23 of the feeding sucker assemblies.

To activate the feeding sucker assembly intermittently a distributor is provided made up of both rotating and stationary parts. The conduit 26, for each feeding sucker assembly terminates at the top in a corresponding slot 84, which is machined in a ring of anti-friction material 85 fixed on to the drum 19 and extending concentrically with the related one of the axes 5[a], 5[b]. The outlet facing downwards of a conduit 86 which is machined radially in an annular disc 87 and which commences just before the assembly reaches the associated one of the stations 1[a], 1[b], is designed to enter into communication with each slot 84. The disc 87, substantially stationary, is mounted on the body 13, in a central position and where the inlet to the conduit 86 is disposed, has gaskets to effect a pneumatic seal with the body 13. Facing the inlet to the conduit 86 is the lower end of a further conduit 88 machined in the body 13 and which has its upper end in communication with a union 89 connected pneumatically to a vacuum source. A flange 90 is keyed to the body 13. The flange 90 is disposed beneath the tubular members 21[b] and above the disc 87; short vertical sliding movements of the disc 87 are possible but it is prevented from rotating by the engagement of pins 91, projecting downwardly from the flange 90; springs 92, interposed between the flange 90 and the disc 87 urge the latter with a sealing force against the ring 85. A feeding sucker [v] is connected to vacuum when the conduit 86 communicates with the associated slot 84, given that this in its turn, is in communication with the conduit 27 of the same feeding sucker by means of the conduit 26, chamber 24 and slot 25 respectively.

A description of the operation of the feeder now follows. Driven by the unit including the Z-wheel 71, the carousels 10[a], 10[b] revolve intermittently in directions D and E respectively around the axes [sa], [sb]. Simultaneously a feeding sucker assembly of the carousel 10[a] and one of the carousel 10[b], by rotation of the carousels, arrive at the position [va] in the station 1[a] and at the position [vb] in the station 1[b] respectively, and the carousels halt. If a sufficient number of products is accumulated against the barriers 3[a], 3[b], feeding suckers [va] and [vb] which are at this time connected to the vacuum source descend on products [a ] and [b] under control of the discs 48 and channel sectors 35[a] and 35[b], and then rise again lifting and carrying the products to a higher level than that of the remaining products, which are again restrained by the barriers 3[a], 3[b]. In the meantime the carousels have resumed rotation, and under the control of the stationary cam groove 79, the feeding sucker assemblies which have lifted a product perform a rotation of 90° around their own axes and in the same direction as that of their own carousels; at the end of this phase, the feeding sucker assemblies pass by rotation from the positions [va], [vb] to positions [va]1, [vb]1 and the products [a] and [b] are passed to positions [a]1, [b]1, having their greater dimensions parallel to the projections 7[a] and containers 8 of the belt 7, i.e. oriented transversely to the belt. At this time the feeding sucker assemblies, with the products still disposed above projections 7[a], generally follow and hence accompany the continuously moving belt 7 and in particular its containers which, being in a suitable phase with the carousels, are destined to receive the lifted products. In fact, whilst the feeding sucker assemblies carrying the products pass angularly from [va]1, [vb]1 to [va]2, [vb]2 the Z-wheel 71 is arranged to confer an angular velocity to the carousels by means of which the components of the linear velocity of the feeding sucker assemblies parallel to the belt 7, reach and then maintain the same velocity as that of the belt. Simultaneously in the corresponding passage of products [a]1, [b]1 to [a]2, [b]2, these, which are in register with corresponding containers 8, together with the appropriate feeding sucker assemblies undergo, under control of the associated stationary cams 79, progressive rotation in an opposite direction to that of the feeding sucker assemblies as they passed from the positions [va], [vb] to the positions [va]1, [vb]1: such counter-rotation provides for the maintenance of the products in transverse orientation to the belt 7. Whilst the products are still in register with the corresponding containers 8, the feeding sucker assemblies are caused to descend under the control of the stationary cam grooves 33, so that the products approach the bottom of the respective containers 8. During the successive passage from position [va]2 to position [va]3 and position [vb]2 to position [vb]3, when the middle of the belt 7 is substantially tangential to the trajectories of the feeding sucker assemblies, the application of vacuum to the feeding sucker assemblies ceases, i.e. the communication of a conduit 86 with a slot 84 and conduit 26 ceases; the products are thus released into the containers 8 and the released products [a]3, [b]3 are carried away by the belt 7. Deceleration of the carousels 10[a], 10[b] follows and the feeding sucker assemblies which have released the products a little beyond the point of tangency indicated above, arrive at positions [va]4, [vb]4 where they halt, the succeeding feeding sucker assemblies being correspondingly above the stations 1[a], 1[b] respectively, for a new cycle. It is to be understood that the feeding sucker assemblies which have released the products, take up again, the angular position relative to their own vertical axes and the level at which they are shown at the appropriate stations.

The feeder described above is susceptible to modifications and variations while still embodying the invention, for example there could be just one delivery belt and therefore a single carousel with feeding sucker assemblies, each carousel could have a number of feeding sucker assemblies other than three, the two carousels could also be arranged to not operate simultaneously, or the sensor devices 4 could be arranged to operate by photo-electric cell instead of mechanically.

Having particularly described our invention and the manner in which it is to be performed, what we claim as new and desire to secure by letters Patent of the United States is:

1. A feeder for picking up products of a generally parallelepiped shape from a pick-up station of a delivery conveyor and feeding the product to a series of containers carried at the start of a receiving conveyor, with the delivery and receiving conveyor being in substantially the same plane comprising:
    (a) a carousel mounted between the pick-up station of the delivery conveyor and the start of the receiving conveyor;
    (b) said carousel being mounted on an axis normal to the delivery and receiving conveyors and above the plane of the delivery and receiving conveyors;
    (c) a series of feeding sucker assemblies mounted in said carousel and angularly arranged around said carousel on an axis parallel to said carousel axis;
    (d) means mounting said sucker assemblies in said carousel for up and down and rotational movement on their axis;
    (e) means for driving said carousel in a predetermined intermittent rotary motion so that said sucker assemblies are stationary above the pick-up station and move in synchronism with the receiving conveyor to be in registery with the containers;
    (f) first control means for controlling up and down movement of said sucker assemblies along their axes arranged so that said assemblies descend and then ascend both when said assemblies are stationary at the pick-up station and when said assemblies are moving in synchronism with the receiving conveyor in register with the containers;
    (g) means controlling the intermittent application of vacuum to said sucker assemblies so that vacuum is applied to effect the lifting of the products from the pick-up station and then their release into containers with which they are in registery;
    (h) second control means for effecting rotational movement of said sucker assemblies around their axes so that the products lifted by them at the pick-up station are subjected, after being lifted, to a rotation so that the products are oriented in accordance with the containers of the receiving conveyor and then, while accompanying this conveyor, to a counter-rotation to maintain the same orientation.

2. A feeder according to claim 1 comprising a device in register with the delivery conveyor, sensitive to the presence of a predetermined minimum number of products accumulated adjacent the pick-up station, this device in the absence of products being arranged to prevent the descent and ascent of said sucker assemblies at the pick-up station.

3. A feeder, according to claim 2 wherein the first control means comprises a cam which is stationary around said carousel and has an interruption in the cam in register with the pick-up station, and a control part mounted for vertical sliding in register with the interruption which at every halt of the carousel is so constructed and arranged to perform sliding movements so that said sucker assembly at the pick-up station is caused to descend and then ascend relative to the station, the descent and ascent relative to the above-mentioned receiving conveyor being caused by the stationary cam.

4. A feeder according to claim 3 wherein each feeding sucker assembly comprises a tubular element mounted for rotation in a vertical tubular member carried on the carousle, the element defining with the tubular member an annular chamber, a rod mounted coaxially by the tubular element slideable longitudinally therein but connected to the tubular element for rotation therewith, a conduit in a lower part of the rod and communicating at an upper-end through a slot in the tubular element with said chamber, a sucker attached to the lower part of the rod and with the outlet of the conduit opening therein, an activating head for the rod controlled by the first control means, said tubular element being controlled for alternate angular movements by the second control means, whilst a rotating distributor means controlling the intermittent application of vacuum to the feeding sucker assemblies is arranged to put the chamber intermittently in communication with a vacuum source.

5. A feeder, according to claim 4 wherein the activating head is mounted for vertical sliding movement on the carousel, and restrained axially but not tangentially by an upper part of the rod which has two opposed activation rollers, one being engaged with the stationary cam and the other for engagement with the control part.

6. A feeder, according to claim 5, comprising a horizontal tubular member radial to the carousel and fixed at an upper-end to the vertical tubular member, a rack slideable lengthwise in the horizontal tubular member, a pinion keyed to the top of the tubular element and in engagement with the rack, the rack being controlled in its movements by a further stationary cam on the carousel, said second control means thus being provided.

* * * * *